IMPEDANCE STABILIZATION OF NONLOADED TELEPHONE CIRCUITS

Filed April 27, 1961 2 Sheets-Sheet 1

INVENTORS R. S. BIDDULPH
A. FEINER
BY
S E Hollander
ATTORNEY

IMPEDANCE STABILIZATION OF NONLOADED TELEPHONE CIRCUITS

Filed April 27, 1961 2 Sheets-Sheet 2

INVENTORS R. S. BIDDULPH
A. FEINER
BY
S E Hollander
ATTORNEY 3,212,029
Patented Oct. 12, 1965

3,212,029

IMPEDANCE STABILIZATION OF NONLOADED TELEPHONE CIRCUITS

Rulon S. Biddulph, Chatham, and Alexander Feiner, Morris Plains, N.J., assignors to Bell Telephone Laboratories, Incorporated, New York, N.Y., a corporation of New York Filed Apr. 27, 1961, Ser. No. 106,078
8 Claims. (Cl. 333—28)

This invention relates to nonloaded telephone lines and, more particularly, to impedance compensators for such lines.

In telephone and other communication systems it is often necessary to maintain the impedance of a transmission path at a constant value. An example of this requirement is to be found in the hybrid circuit of a telephone transmission line. Transition from two-to-four wire transmission is accomplished by this hybrid circuit and its associated balancing network. For maximum return loss it is necessary to insure that the impedance of the two-wire transmission path seen by the hybrid circuit is maintained equal to the impedance of the balancing network.

A trunk circuit connects a telephone trunk to a particular subscriber line. The switching network selects the particular trunk and line to be connected to each other for the completion of a call. The return loss may be maximized by maintaining the impedance of the line as seen by the line side of the trunk circuit at a constant level. This is difficult, however, for the impedance of the line is to a great extent a function of the signal frequency and the length of the line and may vary over a wide range of values. If the line lengths and signal frequencies vary, the cable impedance must somehow be compensated to be kept equal to that of the balancing network.

As the signal frequency in a line increases the negative reactance due to the capacitance of the line increases. This is a well-known phenomenon. Loading of extended lines with inductive elements has long been used in the telephone art. The magnitude of these inductors are determined by the type of the line to be compensated. However, it is impractical to load each subset line with an individual inductor whose value is proportional to the line length. It would be far more economical to provide a variable inductor in the much fewer trunk circuits than in the more numerous lines themselves. If this inductor could be made to vary with the length of the line to which the trunk circuit is connected, the negative reactance of the line, a function of line length as well as signal frequency, could be more cheaply compensated.

In addition to providing compensating positive reactance increasing with line length and signal frequency, it is also desirable to provide an increasing resistive component. The resistance of a line, the real part of its impedance, decreases with frequency at the higher speech frequencies. And this decrease becomes more pronounced the longer the line. For maximum return loss, that is, the most constant input impedance of the line as seen by the trunk circuit, it is necessary to provide resistive as well as inductive compensation which increases with both frequency and line length. It would again be advantageous to provide the resistive compensation in the trunk circuit rather than in the individual lines to further reduce the cost of the compensating equipment.

It is an object of this invention to provide improved telephone transmission circuits.

It is another object of this invention to maximize return losses by maintaining the input impedance of a line more nearly equal to a predetermined value, independent of the line length and signal frequency.

It is another object of this invention to provide both inductive and resistive compensation, the element values varying as a function of line length and signal frequency.

It is still another object of this invention to provide this compensation in the trunk circuits rather than in the more numerous line circuits.

It is a further object of this invention to provide this compensation with a minimum number of components and at a minimum cost.

The trunk circuit utilized in the illustrative embodiments of the invention consists primarily of a lossy transformer connecting the line and trunk transmission paths. Each of the two windings contains two coils. One end of each primary coil is connected to a different one of the two wires in the line circuit. The other ends of the primary coils are connected between a potential source. This source supplies current to power the subset.

The transformer coils are lossy, that is, they contain non-negligible resistive components. This is necessary to reduce the subset current for short lines. The direct current in the line which powers the subset is inversely proportional to the direct-current resistance of the line. To insure that this current does not exceed a maximum value endangering the subset and the transformer coils, it is necessary to provide a minimum resistance in the circuit. By providing lossy coils this resistance is in the trunk circuit itself and there is no danger of exceeding the maximum current even for short lines connected to the trunk circuit.

The voice signals are thus advantageously not transmitted between the line and trunk paths via the transformer itself as the latter attenuates the signals due to its resistive components. Capacitors are interposed beween the line and trunk wires and separate the primary and secondary coils of the transformer. These capacitors, of negligible alternating-current impedance, block direct current and transmit alternating current only. There is almost no attenuation of the signal level itself across the trunk circuit.

In the illustrative embodiments of the invention, unlike the prior art in which the capacitance of long lines has been compensated with inductors placed in the line circuits themselves, these inductors are placed not in the lines themselves but rather in series with the capacitors between the primary and secondary coils of the trunk circuit transformer. These inductors provide the conventional positive reactance compensation for all lines connected to the trunk circuit. However, the placing of the coils between the windings of the transformer rather than in the line itself provides a unique and highly advantageous form of compensation. Not only is inductive compensation achieved but resistive compensation is obtained as well. And this added compensation is obtained without the incorporation of any additional resistive components. With a coil inserted in series with the capacitors and between the transformer terminals, as the frequency of the transmitted signal increases the capacitors, dut to the series coils, are no longer able to provide a low impedance path for the signal across the trunk circuit. The impedance between the primary and secondary coils of the transformer increases as the compensating coils are internal to the trunk circuit rather than external to it. This increasing impedance forces some of the signal current to be diverted to the coils of the transformer. Unlike conventional circuits, high frequency signals no longer bypass the trunk circuit via the interconnecting capacitor. Instead, some of the current flows through the lossy resistive coils. The resistance of the coils, which is necessary anyway to insure that the maximum direct current is not exceeded, provides resistive compensation for the line. Thus, resistive as well as inductive compensation is achieved with increasing frequency by the insertion of only an inductive component into the circuit. Improved compensation, by providing an increasing resistive component with frequency, is obtained without requiring an additional resistive element. The resistance added to the line increases with frequency because the higher the frequency the more current that is diverted to the transformer.

This improved inductive and resistive compensation is a function of frequency only and is thus inserted for all lengths of line. For short lines, however, this compensation might have a deleterious effect on return loss as the capacitance of the line is negligible and the alternating-current resistance is greater. It is more advantageous to remove both the inductive and resistive compensation for short lines, that is, to vary the degree of compensation in accordance with the line length. A compensating coil when placed in a line can be made to vary as a function of line length by providing it with a saturating core. A saturating inductor presents an alternating-current impedance that is an inverse function of the direct current flowing through the coil. An increasing direct current causes further saturation of the core and the inductance is correspondingly reduced. In this manner large direct currents which exist in short lines due to the smaller cable resistance effectively remove the inductor from these lines.

However, in our invention there is no direct current flowing through the loading coils. The coils are purposely placed proximate to the capacitors for introducing varying resistive compensation without requiring additional circuitry. The capacitor blocks all direct current and thus the direct current of the line cannot control the saturation of a core if inserted in the inductor.

In two illustrative embodiments of our invention, rather than utilizing a single coil next to each capacitor this coil is made one winding of a second transformer. The other winding of the transformer is placed in the direct-current circuit and the core of the transformer is saturating. In this manner the direct current in the line which flows through the primary of the second transformer causes the core to saturate to a degree proportional to the magnitude of the direct current or inversely proportional to the line length. The coil inductance thus varies in magnitude as a function of the direct current of the line even though there is no direct current through the coil itself. The direct current through the primary in the line controls the saturation of the transformer core which, in turn, controls the value of inductance of the secondary coil. Thus, the compensating inductance is proportional not only to the frequency of the signal but is proportional to the length of the line as well. Since the amount of the resistive compensation added to the line is a function of the amount of current diverted by the compensating coil to the transformer coils which, in turn, is a function of the inductance of the coil, the resistive compensation varies both as a function of frequency and of line length.

It is a feature of this invention to provide an inductor between the two windings of a trunk circuit transformer.

It is another feature of this invention to provide the windings of the trunk circuit transformer with resistive components both for controlling the maximum direct current in a line circuit and, by means of the inductor or a second transformer, for introducing a variable real component in the alternating-current impedance of the line as well.

It is another feature of this invention to provide means for controlling the magnitude of the inductance of the added inductor or transformer and thus the degree of real and reactive compensation in accordance with the direct current in the line.

A complete understanding of this invention and the various features thereof may be gained from consideration of the following detailed description and the accompanying drawing, in which.

Figure 1:
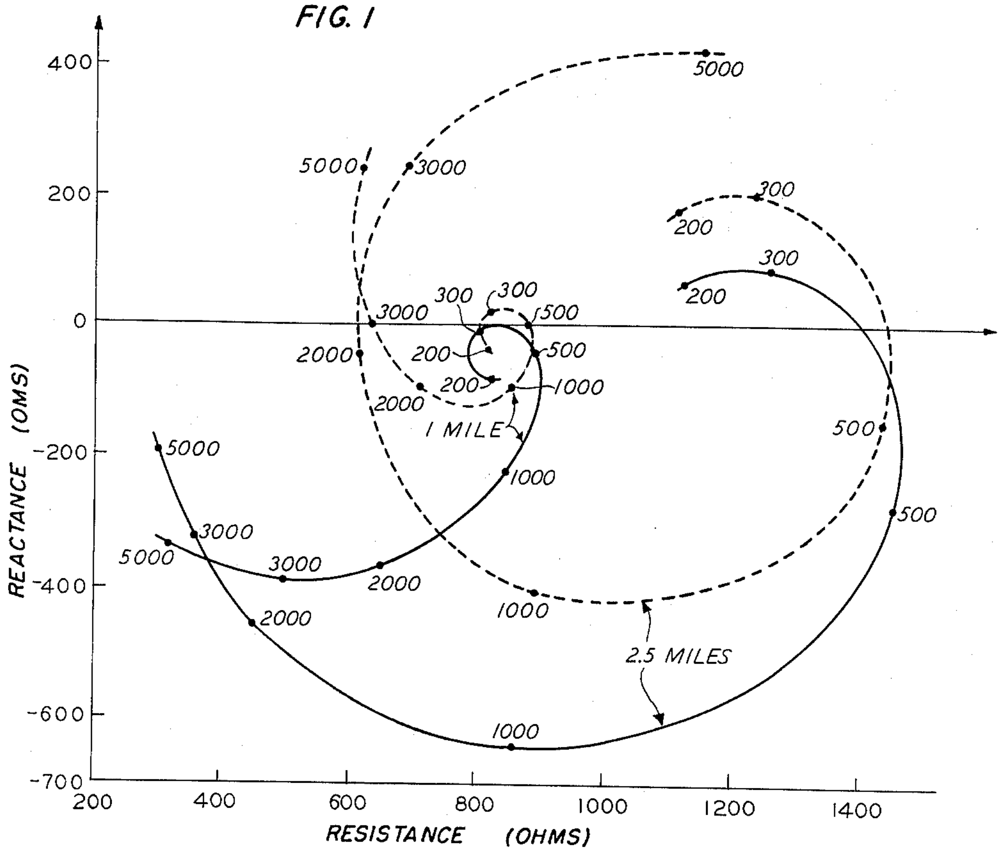
FIG. 1 shows, as a function of frequency, the impedance of a cable, when both compensated in accordance with this invention, and when not so compensated.

Referring now to FIG. 1, the uncompensated (continuous curves) and compensated (dotted curves) line impedances as a function of frequency are shown for a relatively short and a relatively long 24-gauge cable terminated in an off-hook 500D subset. The balancing network used in many telephone applications is effectively a two microfarad capacitor in series with a 900-ohm resistance. Thus, for maximum return loss, it is desired that the cable input impedance be as close to 900 ohms +2.14 microfarads as possible for all frequencies and all lengths of line.

The dotted curves show the compensated line impedances in accordance with an aspect of our invention and are described in detail below.

The continuous curves show the uncompensated cable and subset impedances as a function of frequency. It is seen that over a wide range of frequencies the negative reactance increases with frequency due to the capacitance of the cable. Thus, it is necessary to insert an inductance at high frequencies to cancel this negative reactance.

It is also apparent that at high frequencies it is necessary to insert a positive resistance to bring the total resistance of the cable and subset closer to the nominal 900-ohm value.

The curves also show that although inductive and resistive compensation is required for both the 1 and 2.5-mile lengths, the degree of compensation is far greater for the longer cable. For example, consider a frequency of 2,000 cycles-per-second. The 1-mile curve shows that almost perfect compensation may be achieved if a resistive component of 250 ohms and a positive reactance of 310 ohms are added to the cable. These components would bring the line impedance to a pure resistance of approximately 900 ohms in parallel with the reactance of a 2.14 microfarad capacitor at 2,000 cycles-per-second.

For the 2.5-mile length, on the other hand, at the same frequency of 2,000 cycles-per-second approximately 450 ohms of resistance and 410 ohms of positive reactance are needed. It is seen that over a large frequency range centered at about 1,000 cycles-per-second more resistance and positive reactance must be inserted in the 2.5-mile cable than in the shorter 1-mile length for the same frequency.

It is important that this relationship be maintained. The most advantageous compensation is achieved only when the compensating real and reactive components increase with line length as well as signal frequency. For example, if a constant value of inductance is inserted in all lines independent of their length and this inductance is adjusted to provide approximately 560 ohms of positive reactance at 1,000 cycles-per-second, the 2.5-mile cable is almost perfectly compensated with respect to the reactance of the line, that is, its reactance is approximately that of a 2.14 microfarad capacitor at 1,000 cycles-per-second. For the shorter line length, however, 560 ohms of positive reactance at 1,000 cycles-per-second changes the reactive component of impedance of the line from −240 to approximately +320 ohms.

Thus, to adequately compensate the line impedance, it is not only necessary to provide resistive and reactive components increasing with frequency but to adjust this variation in accordance with the line length.

Figure 3:
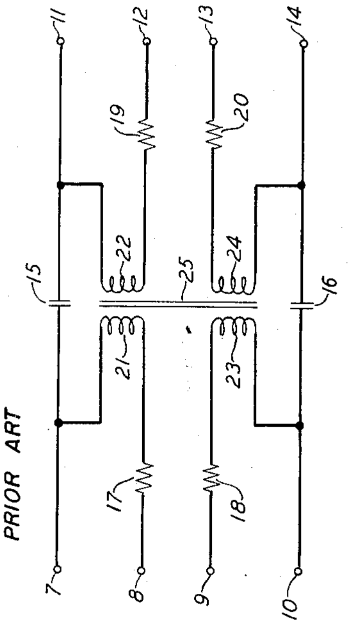
FIG. 3 PRIOR ART
FIG. 3 is a schematic diagram of the trunk circuit with which the illustrative embodiments of our invention are utilized.

FIG. 3 discloses an illustrative trunk circuit with which the means of this invention may be utilized. The switching network connects terminals 7 and 10 to a particular subscriber line. Subset power is supplied by placing a positive potential across terminals 8 and 9. Direct current flows through resistor 17, which may represent the resistance associated with coil 21, through coil 21, the cable and subset, coil 23 and resistor 18 back to the source. The magnitude of this current is determined by the resistance of these elements. Resistors 17 and 18 insure that the direct current does not exceed a maximum value endangering the transformer coils and subset.

The trunk side of the circuit is similar to the line side with terminals 11 and 14 corresponding to terminals 7 and 10, terminals 12 and 13 to terminals 8 and 9, resistors 19 and 20 to resistors 17 and 18, and the secondary coils 22 and 24 of transformer 25 to the primary coils 21 and 23.

It is inefficient to couple the line and trunk circuits by transformer 25 only. The voice signal currents would be attenuated by resistors 17–20 and the output signals on terminals 7 and 10 and terminals 11 and 14 would be correspondingly reduced. For this reason capacitors 15 and 16 are inserted directly in the transmission path itself between the primary and secondary coils of transformer 25. These capacitors shunt all alternating-current signals in the line and trunk transmission paths across the transformer coils. Thus there is no attenuation of the alternating-current signal by the resistors.

It should be noted that resistors 17–20 are not necessarily individual component elements and may instead be realized by providing transformer 25 with lossy coils 21–24.

Figure 4:
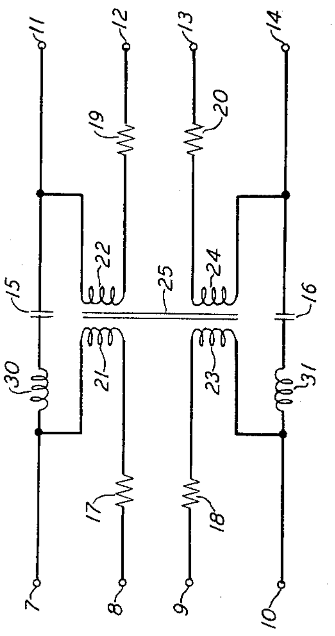
FIG. 4 is a schematic diagram of the basic compensating circuit of the invention as applied to the circuit of FIG. 3.

FIG. 4 shows the introduction of coils 30 and 31 placed between the primary and secondary winidngs of transformer 25. The placing of these coils is different from the manner in which these coils have been utilized in the prior art. Heretofore, when required, coils have been inserted in the line or trunk transmission paths themselves, but not between the coils of the transformer. When placed in this conventional manner, it is apparent that inductive compensation alone is achieved. For example, consider coil 30 to be moved to the left in FIG. 4 so that it is proximate to terminal 7. It is true that as the frequency of the voice signal increases a positive reactance equal ot the $2\pi fL$ is inserted in the line, where $f$ is the frequency of the signal and L is the magnitude of inductance 30. The voice signal is affected by inductor 30 in the desired manner. But all signal currents pass through the effectively short-circuited path comprising capacitor 15 and are diverted from the transformer coils. In FIG. 4, however, as the frequency of the signal increases the impedance of the path comprising inductor 30 and capaictor 15 is no longer negligible. The impedance is now approximately equal to $2\pi fL$ which is not negligible in comparison with the impedance presented by coils 21–24 and resistors 17–20. Consequently, some of the signal current is diverted down into the coils. Effectively, a resistive component due to resistors 17–20 is inserted in the line and the total impedance is determined by the combination of inductor 30, coils 21–24 and resistors 17–20. The greater the frequency, the greater the fraction of total signal current diverted to the transformer coils and resistors. As the frequency of the signal increases, the impedance presented by inductor 30 increases and more and more current is diverted to the transformer circuit. The greater the amount of current diverted, the greater is the total real component of impedance seen by the signal current. Thus, the placing of inductor 30 as shown in FIG. 4 not only provides the conventional loading effect but provides frequency sensitive resistive compensation as well. And this is achieved without the insertion of additional resistive components in the circuit.

The circuit of FIG. 4 is further advantageous because the pair of inductors 30 and 31 need be provided only for every trunk circuit rather than for every line. The trunk circuits are generally less numerous than the number of lines to which they may be connected and by providing the compensating network means in the trunk circuit a savings in cost may be realized.

Although the compensation of FIG. 4 is highly advantageous the compensating elements do not vary in accordance with line length as well as signal frequency. It has been shown above that the most adequate compensation is achieved when the component values increase with line length also.

The direct current from the potential source powering the subset is a measure of the line length. The direct current increases with decreasing line length. In certain embodiments of our invention the value of the inductance of inductor 30 is controlled in accordance with the magnitude of this current and thus both resistive and inductive compensations are functions of line length as well as signal frequency.

Figure 2:
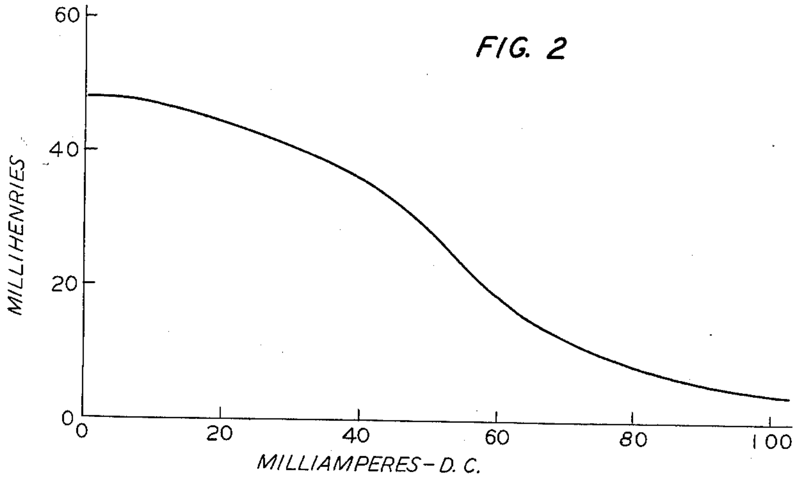
FIG. 2 shows the variation of secondary inductance with primary direct current in the saturable transformer of certain embodiments of this invention.
Figure 5:
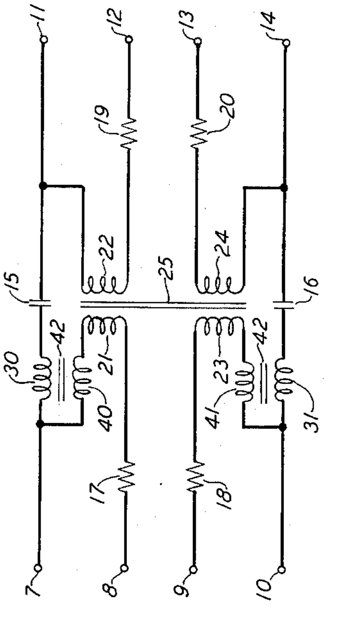

FIG. 5 discloses a circuit for varying the magnitude of inductor 30 in accordance with the direct current of the line for controlling the degree of compensation. Inductor 30 is now wound around core 42 with additional coil 40 being wound on the same core. Similar remarks apply to coils 31 and 41. The inductance of coils 30 and 31 is a function of the degree of saturation of core 42. The degree of saturation of core 42 is, in turn, a function of the direct current through coils 40 and 42. As the direct current increases the core saturates further and the inductance of coils 30 and 31 decreases. This effect is shown graphically in FIG. 2 where the inductance of coils 30 and 31 is shown decreasing with increasing direct current in coils 40 and 41.

For short lines where th direct current is large the inductor presents a smaller impedance to the voice signals. The inductive compensation is thus reduced for short lines as inductors 30 and 31 present a lower impedance to the voice signals. In addition, as the degree of resistive compensation is determined by the amount of current diverted to the transformer coils and resistors, it is seen that the resistive compensation for short lines is decreased as well. The shorter the line, the greater the fraction of total voice signal that bypasses the transformer.

Figure 6:
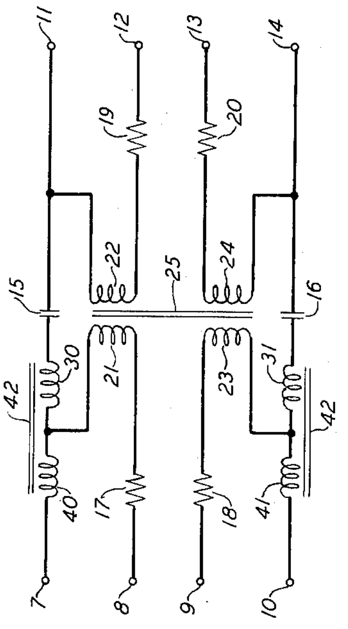
FIGS. 5 and 6 are modifications in the circuit of FIG. 4 for varying the degree of compensation in accordance with the direct current in the line.

FIG. 6 is similar to FIG. 5 except for the fact that coils 40 and 41 are now placed in the line transmission path itself. As in FIG. 5, the direct current through these coils determines the degree of saturation of core 42 which, in turn, determines the magnitude of inductors 30 and 31 and the consequent degree of real and reactive compensation.

The improved impedance characteristics obtained by the incorporation of the compensating network of FIG. 5 is shown in FIG. 1. Similar curves are obtained for the network of FIG. 6. The continuous curves represent the impedance of the line for two fixed lengths of 1 and 2.5 miles as a function of frequency. The dotted curves represent the impedance of the same lines when the compensating network is inserted in the trunk circuit.

The ideal impedance of the line is approximately 900 ohms of real impedance. For the one-mile length of cable it is seen that at some frequencies even lower than 500 cycles-per-second the input impedance of the line is closer to the desired 900 ohms. For higher frequencies the improvement is even more marked as the helical-shaped compensated curve does not expand at a rate as great as the uncompensated plot. Great improvement is achieved over a wide frequency range. At 3,000 cycles-per-second, for example, the resistance of the line is increased from 500 ohms to about 650. The 375-ohm negative reactance is completely canceled.

Similar remarks apply to the even longer 2.5-mile cable Again, points on the helical-shaped compensated curve are closer to the ideal 900-ohm value than are the corresponding points on the uncompensated curve. An improved impedance characteristic of the line is obtained for all frequencies higher than approximately 500 cycles-per-second.

It should be noted that the compensating networks of FIGS. 4–6 are symmetrical, that is, similar components are connected to each of the two wires in the transmission path. Although adequate compensation would be achieved with the use of only one of inductors 30 or 31 and only one set of windings on core 42, it is general practice in the telephone art to provide symmetrical circuits in each wire of a transmission path to prevent undesired transient signals.

Although the compensating network improves the impedance characteristic of the line with respect to line length it is to be understood that compensation is similarly provided for external and other conditions affecting the line as well. For example, temperature variations may affect the D.C. and A.C. resistances of the line in a like manner. Thus, the direct current in the line, a function of temperature as well as line length, adjusts the A.C. impedance of the line to provide a total input impedance to the line nearer to the desired value.

It is seen that with our invention resistive as well as inductive compensation may be obtained by the use of inductive components only. In addition, it is not necessary to provide compensation for every line but instead the same compensation may be achieved by modifying the less numerous trunk circuits. And the degree of both the inductive and resistive compensation may be varied in accordance with the length of the line as well as the signal frequency by the incorporation of an additional saturating transformer in each trunk circuit.

It is understood that the embodiments shown are merely exemplary and that various modifications will be apparent to those skilled in the art without departing from the scope of the present invention.

What is claimed is:

1. A compensator for a telephone transmission path exhibiting real and reactive components of impedance variably dependent on the frequency of the signal transmitted therethrough, said compensator comprising a capacitor serially connected in said path, a transformer having a primary winding shunt connected to said path at one side of said capacitor and a secondary winding shunt connected to said path at the other side of said capacitor, said primary and secondary windings including a resistive component, and means for increasing the positive reactance and positive resistance of said transmission path with increasing signal frequency, said means including an inductor connected in series with said capacitor in said path between said shunt-connected primary and secondary windings for diverting a portion of the signal current in said path to said windings dependent upon the frequency of said signal current.

2. A compensator for a transmission path in accordance with claim 1 wherein said inductor exhibits a variable inductance and comprises at least one winding of a saturable core transformer, the saturation of which varies in accordance with the length of said path.

3. A compensator for a transmission path in accordance with claim 2 wherein another winding of said saturable core transformer is connected in series with said primary winding.

4. A compensator for a transmission path in accordance with claim 2 wherein another winding of said saturable core transformer is connected in series in said transmission path to the other side of said shunt connection of said primary winding.

5. In a two-wire transmission path for direct and alternating components of signal current, first transformer means having two primary and two secondary windings having resistance components, one end of each of said primary windings connected to a different one of said wires, one end of each of said secondary windings connected to a different one of said wires, capacitive means interposed along each of said wires and separating said primary and seconday windings, and second transformer means having two primary and two secondary coils and saturating core means saturable in accordance with said direct-current component of said signal current, said primary coils being connected between said two primary windings and said two wires, said secondary coils being connected between said capacitive means and the junctions of said primary coils and said wires.

6. In a two-wire transmission path for direct and alternating components of signal current, first transformer means having two primary and two secondary windings having resistance components, one end of each of said primary windings connected to a different one of said wires, one end of each of said secondary windings connected to a different one of said wires, capacitive means interposed along each of said wires and separating said primary and secondary windings, and second transformer means having two primary and two secondary coils and saturating core means saturable in accordance with said direct-current component of said signal current, said secondary coils being connected between said capacitive means and said primary windings along said wires, said primary coils being series connected along said wires.

7. In a transmission path having direct current and an alternating signal current transmitted therethrough and real and reactive components of impedance variably dependent on the length of said path and the frequency of said alternating signal current, said direct current being dependent on the length of said path, a compensator comprising a transformer having both primary and secondary windings connected to said path, said windings having a regulating resistance, inductive means including a saturable magnetic core having a winding interposed along said transmission path between said primary and said secondary windings, and means for controlling the saturation of said core in accordance with the magnitude of said direct current.

8. In a transmission path having both a direct current variably dependent on the length of said path and an alternating signal current transmitted therethrough and wherein the real and reactive components of impedance presented to said alternating signal current are variably dependent on the length of said path and the frequency of said alternating signal current, a compensator for providing an approximately constant line impedance substantially independent of path length and signal current frequency comprising a capacitor serially connected in said path, a transformer having a primary winding shunt connected to said path at one side of said capacitor and a secondary winding shunt connected to said path at the other side of said capacitor, said primary and secondary windings each including a resistive component, and a saturable core transformer having a primary coil and a secondary coil, said secondary coil being connected between said capacitor and said primary winding along said path, said primary coil being connected in the path of said direct current for controlling the saturation of the core of said saturable core transformer and the inductance of said secondary coil in accordance with the magnitude of said direct current.

References Cited by the Examiner

UNITED STATES PATENTS

| | | | |
|---|---|---|---|
| 1,930,759 | 10/33 | Laurent | 333—29 |
| 1,951,883 | 3/34 | Roseway | 333—11 |
| 2,039,202 | 4/36 | Vos | 333—11 |
| 2,204,721 | 6/40 | Blumlein | 333—28 |
| 2,301,023 | 11/42 | Darlington | 333—32 |
| 2,333,148 | 11/43 | Botsford | 333—11 |
| 2,947,592 | 8/60 | Hughes | 333—11 |

HERMAN KARL SAALBACH, *Primary Examiner.*